United States Patent [19]
Nakamura

[11] Patent Number: 6,008,795
[45] Date of Patent: *Dec. 28, 1999

[54] VIDEO PROCESSOR WHICH OUTPUTS A SELECTED RGB OR NTSC VIDEO DISPLAY SIGNAL FROM A VIDEO MEMORY THAT STORES RGB DATA

[75] Inventor: Satoshi Nakamura, Kawasaki, Japan

[73] Assignees: Fujitsu Limited; Fujitsu General Limited, both of Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/644,826

[22] Filed: May 10, 1996

[30] Foreign Application Priority Data

Jul. 11, 1995 [JP] Japan .................... 7-175219

[51] Int. Cl.⁶ .................................................. G09G 5/04
[52] U.S. Cl. .......................................................... 345/154
[58] Field of Search ................................ 345/3, 132, 154, 345/428; 348/441, 552, 554, 555, 557, 642

[56] References Cited

U.S. PATENT DOCUMENTS

| | | | |
|---|---|---|---|
| 3,970,776 | 7/1976 | Kinuhata et al. . | |
| 4,480,267 | 10/1984 | van den Avoort et al. . | |
| 4,855,728 | 8/1989 | Mano et al. ................................. | 345/3 |
| 5,065,346 | 11/1991 | Kawai et al. ............................ | 345/428 |
| 5,119,074 | 6/1992 | Greaves et al. .......................... | 345/154 |
| 5,327,156 | 7/1994 | Masukane et al. .......................... | 345/3 |
| 5,402,180 | 3/1995 | Jung ........................................ | 348/642 |
| 5,423,555 | 6/1995 | Kidrin ...................................... | 364/410 |
| 5,506,602 | 4/1996 | Yokoyama ............................... | 345/132 |
| 5,526,055 | 6/1996 | Zhang et al. ............................. | 348/510 |
| 5,563,665 | 10/1996 | Chang ...................................... | 348/552 |
| 5,572,259 | 11/1996 | Nohara .................................... | 348/441 |
| 5,579,056 | 11/1996 | Chang ...................................... | 348/555 |
| 5,610,630 | 3/1997 | Nakamura et al. . | |
| 5,644,336 | 7/1997 | Herbert .................................. | 345/154 |
| 5,680,175 | 10/1997 | Yanai et al. ............................. | 345/441 |

FOREIGN PATENT DOCUMENTS

| | | |
|---|---|---|
| 53-31572 | 9/1978 | Japan . |
| 63-18394 | 4/1988 | Japan . |
| 3-270577 | 12/1991 | Japan . |
| 4-188211 | 7/1992 | Japan . |
| 5-45789 | 6/1993 | Japan . |
| 6-118925 | 4/1994 | Japan . |
| 6-197863 | 7/1994 | Japan . |
| 6-289844 | 10/1994 | Japan . |
| 6-311491 | 11/1994 | Japan . |

*Primary Examiner*—Jeffery Brier
*Assistant Examiner*—Paul A. Bell
*Attorney, Agent, or Firm*—Staas & Halsey

[57] ABSTRACT

A video data output device includes a memory unit which stores video data conforming with a first display mode, and a memory control unit which controls a write operation on the memory unit so that video data is written therein in the first display mode and controls a read operation thereon so that the video data is read at a timing based on the first display mode or a second display mode. Further, the video data output device includes a converter unit which converts the video data read from the memory unit at the timing based on the second display mode into video data conforming with the second display mode.

5 Claims, 13 Drawing Sheets

FIG. 5A HSYNC

FIG. 5B VSYNC

FIG. 6

FIG. 7A HSYNC
FIG. 7B OUTPUT OF COMP 28

FIG. 8A VSYNC
FIG. 8B OUTPUT OF COMP 29

VIDEO PROCESSOR WHICH OUTPUTS A SELECTED RGB OR NTSC VIDEO DISPLAY SIGNAL FROM A VIDEO MEMORY THAT STORES RGB DATA

BACKGROUND OF THE INVENTION

1. Field of the Invention

The present invention generally relates to information processing devices and methods, and more particularly to an information processing device and method capable of displaying an image based on video data in different display formations such as a monitor display formation such as a RGB display formation and a television display formation such as an NTSC formation.

Recently, there has been a demand to display images formed by the RGB display formation on a television on which images are displayed in a predetermined television display formation such as the NTSC formation. The above demand has increased due to reduction in the cost of personal computers and development of various multimedia products. The personal computers use a RGB monitor on which images can be displayed in the RGB display formation. A television display formation such as the NTSC display formation, which is widely used, is capable of forming a large picture plane.

As is well known, the RGB display formation and the NTSC formation have different synchronizing signals and different numbers of scanning lines. Hence, if an image formed by the RGB video signal is displayed on an NTSC-formation display, it is necessary to convert the RGB video signal into a signal which conforms with the NTSC display formation.

2. Description of the Related Art

Generally, an information processing device has a plurality of picture-plane modes. Examples of such picture-plane modes are a 320×200 resolution mode, 640×400 resolution mode, and 640×480 resolution mode. These resolution modes use different synchronizing signals of, for example, 15 kHz, 24 kHz and 31 kHz. When one of the resolution modes is selected, the corresponding synchronizing signal is selected. A display unit detects the selected synchronizing signal with which video data is transferred, and alters the number of horizontal scanning lines. The RGB display formation can handle various display modes at the display unit side and is increasingly used.

Generally, a scan converter is used to convert video data in conformity with the RGB display formation into video data in conformity with the NTSC display formation. It will be noted that the RGB display formation can have an arbitrary number of horizontal scanning lines, while the NTSC display formation has only a predetermined single number of horizontal scanning lines. The scan converter is equipped with video memories designed to facilitate outputting image data in the NTSC display formation. More particularly, the video memory built into the scan converter has video memories which amount to one picture plane and each of such video memories has 200 horizontal lines. The video data output in the RGB display formation is subjected to a predetermined image process, and is written into other video memories in conformity with the NTSC display formation. When video data amounting to one picture plane is completely written into the video memories for the NTSC display formation, the video data stored therein is read in synchronism with the NTSC synchronizing signal.

As described above, the scan converter needs video memories suitable for the RGB display formation and other video memories suitable for the NTSC display formation. Hence, the conventional scan converter has a large circuit scale.

With the above in mind, an improvement has been proposed in Japanese Laid-Open Patent Application No. 6-118925, the disclosure of which is hereby incorporated by reference. This application discloses a device which converts video data formed in conformity with the RGB display formation into video data formed in conformity with a television display formation such as the NTSC formation.

More particularly, an instruction to output video data from a video RAM (VRAM) is given to the VRAM in accordance with a cycle defined by the ratio of horizontal scanning lines between the video data and a television signal. The video data thus read from the VRAM is cyclically latched in a plurality of buffers so that video data corresponding to one line is stored on one of the buffers. The video data cyclically latched in the buffers is subjected to an interpolation process in synchronism with the horizontal synchronizing signal of the television signal. In this way, the television signal having interpolated signal components is finally generated.

However, the device disclosed in the above application cannot function for outputting the RGB video data although the device can output the television signal obtained by performing the converting operation on the RGB video data.

SUMMARY OF THE INVENTION

It is an object of the present invention to provide a video data output device capable of, by means of a common video RAM, outputting not only a television video signal obtained by performing a converting operation on an RGB video signal but also the RGB video signal.

The above object of the present invention is achieved by a video data output device comprising: a memory unit which stores video data conforming with a first display mode; a memory control unit which controls a write operation of the memory unit so that video data is written therein in the first display mode and controls a read operation thereon so that the video data is read at a time based on the first display mode or a second display mode; and a converter unit which converts the video data read from the memory unit at the time based on the second display mode into video data conforming with the second display mode.

The video data output device may further comprise a switch which specifies one of the first and second display mode, wherein the memory control unit makes the video data read from the memory unit at the time based on said one of the first and second display modes specified by the switch.

The video data output device may further comprise a selector which selects one of the video data conforming with the first display mode and the video data conforming with the second display mode.

The video data output device may further comprise a selector which selects one of the video data conforming with the first display mode and the video data conforming with the second display mode in accordance with a setting of said switch.

In the above video data output device, the first display mode is a mode having a variable number of scanning lines for forming a display plane, and the second display mode is another mode having a fixed number of scanning lines for forming a display plane.

Another object of the present invention is to provide an information processing device comprising a central processing unit which performs a predetermined process including a process for generating video data conforming with a first display mode, a memory unit which stores the video data generated by the central processing unit, a memory control unit which controls a write operation of the memory unit so that video data is written therein in the first display mode and controls a read operation so that the video data is read at a timing based on the first display mode or a second display mode, a converter unit which converts the video data read from the memory unit at the timing based on the second display mode into video data conforming with the second display mode, and a digital-to-analog converter which converts the video data read from the memory unit or the video data output by the converter unit into a corresponding analog signal.

A further object of the present invention is to provide a method of outputting video data, said method comprising the steps of storing video data conforming with a first display mode in a memory unit, controlling a write operation on the memory unit so that video data is written therein in the first display mode and controlling a read operation so that the video data is read at a timing based on the first display mode or a second display mode, and converting the video data read from the memory unit at the timing based on the second display mode into video data conforming with the second display mode.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
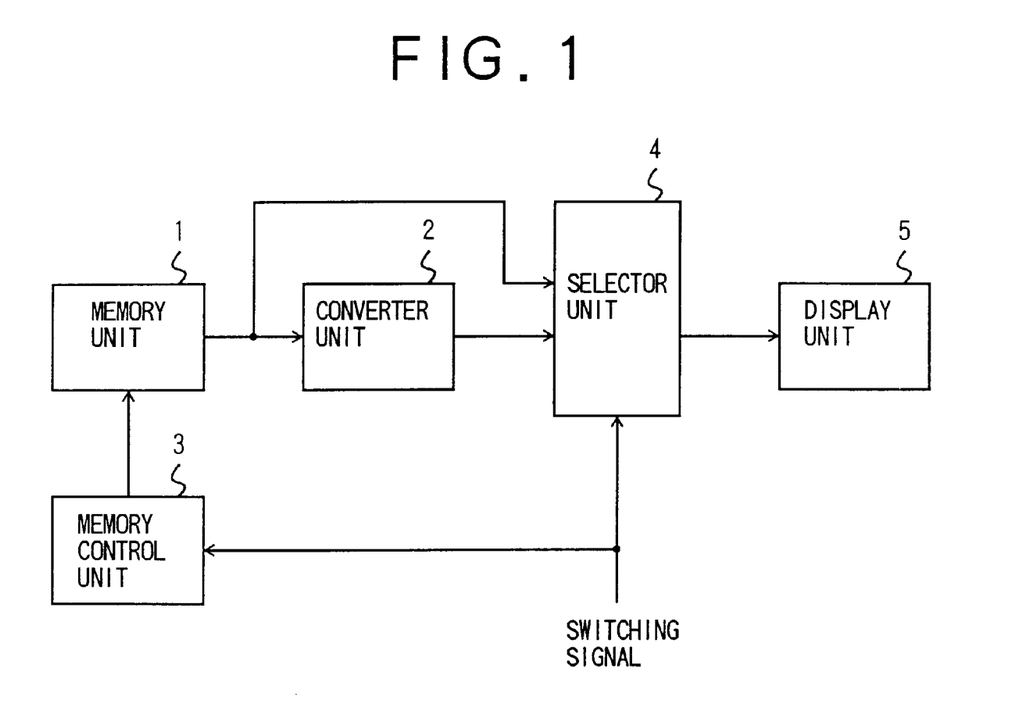
FIG. 1 is a block diagram of the principle of a display data output device according to the present invention.

FIG. 1 is a block diagram of the present invention. A video data output device shown in FIG. 1 is connected to a display unit 5, and includes a memory unit (such as a VRAM) 1, a converter unit 2, a memory control unit 3 and a selector 4. The memory unit 1 stores video data (signal) formed in conformity with a monitor display formation. The memory control unit 3 selects one of predetermined display modes in response to a switching signal. More particularly, the memory control unit 3 selects either a monitor display formation such as the RGB display formation or a television display formation such as the NTSC display formation, and applies a corresponding timing or control signals to the memory unit 1. When the RGB display formation is selected, the RGB video data is read from the memory unit 1 in a way suitable for the RGB display formation under the control of the memory control unit 3. When the NTSC display mode is selected, the RGB video data is read from the memory unit 1 in a way suitable for the NTSC display formation under the control of the memory control unit 3. The converter unit 2 converts the RGB video data read from the memory unit 1 into corresponding NTSC television (video) data. The selector unit 4 selects either the RGB video data from the memory unit 1 or the NTSC television signal from the converter unit 2 in response to the switching signal. The selected video signal is applied to the display unit 5.

Figure 2:
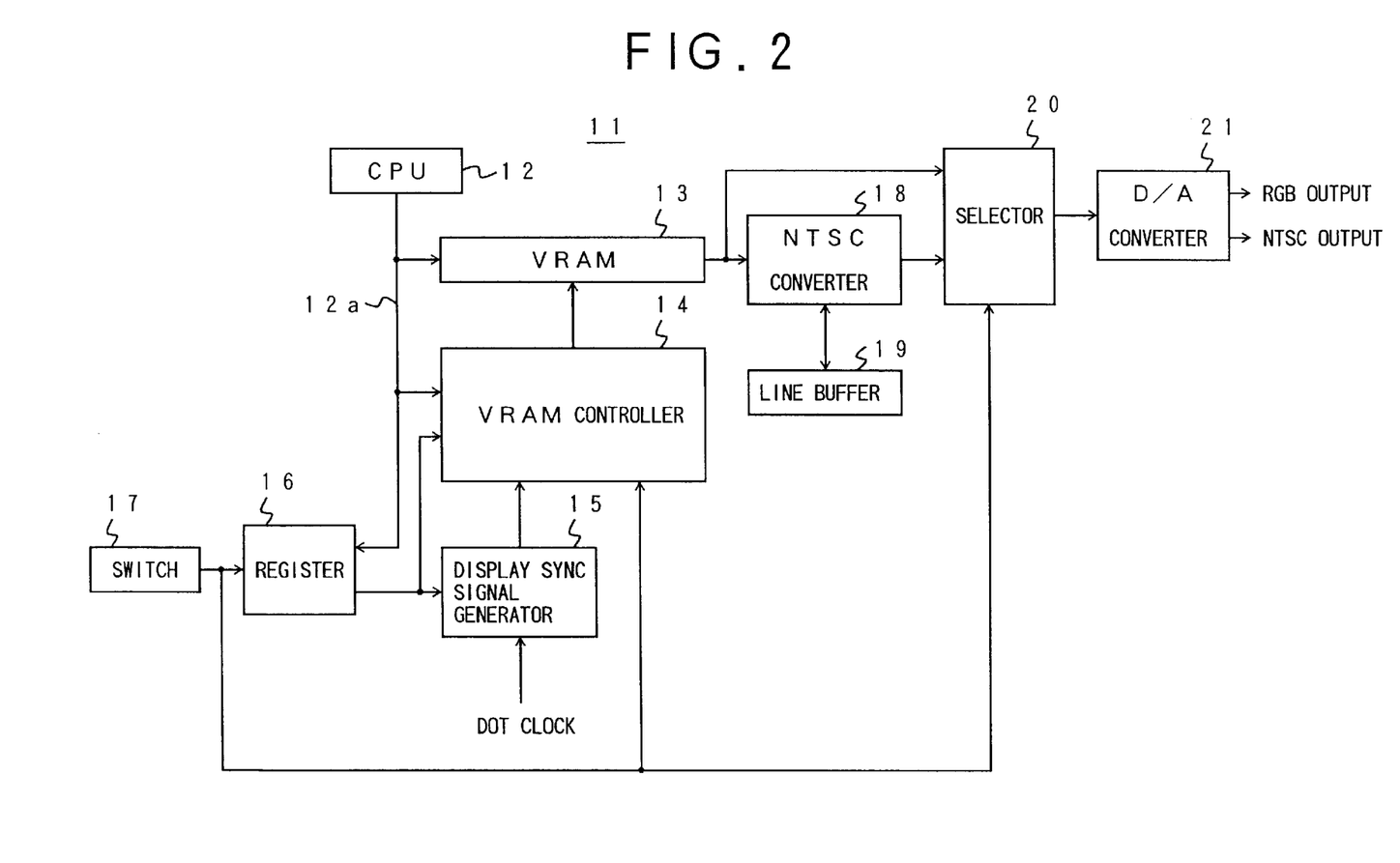
FIG. 2 is a block diagram of an information processing device according to an embodiment of the present invention.

FIG. 2 is a block diagram of an information processing device 11 according to an embodiment of the present invention. The information processing device 11 includes a CPU 12, a video RAM (VRAM) 13, a VRAM controller 14, a display synchronizing signal generator 15, a register 16, a switch 17, an NTSC converter 18, a line buffer 19, a selector 20 and a D/A (digital-to-analog) converter 21.

The CPU 12 controls the operation of the information processing device 11. For example, the CPU 12 performs a data process for generating video data of the RGB display formation. The VRAM 13 receives the RGB video data under the control of the CPU 12 and stores it therein. The VRAM controller 14 controls read and write operations on the VRAM 13 so that the RGB video data generated under the control of the CPU 12 is written into the VRAM 13 and read therefrom. The display synchronizing signal generator 15 derives a display synchronizing signal from a dot clock signal, which is, for example, externally supplied. The display synchronizing signal is applied to the VRAM controller 14. The register 16 stores data related to a RGB display mode and data related to an NTSC display mode. The data read from the register 16 is applied to the VRAM controller 14 and the display synchronizing signal generator 15. The switch 17 is used to select either the RGB display mode or the NTSC display mode. When the RGB display mode is specified by the switch 17, the data related to the RGB display mode can be read from the register 16. When the NTSC display mode is specified, the data related thereto can be read from the register 16.

The output signal of the switch 17 is also applied to the VRAM controller 14 and the selector 20. The VRAM controller 14 controls the read operation on the VRAM 13 in accordance with the specified mode. The selector 20 selects the RGB video data read from the VRAM 13 when the RGB display mode is specified, and selects NTSC television data output by the NTSC converter 18 when the NTSC display mode is specified.

The NTSC converter 18 converts the RGB video data read from the VRAM 13 into NTSC television data. During the converting operation, the NTSC converter 18 uses the line buffer 19, which stores data corresponding to one line of the display plane. The selector 20 selects either the RGB video data or NTSC television data in response to the switching signal from the switch 17. The D/A converter 21 converts the received data in digital formation into an analog RGB video signal or an analog NTSC television signal.

Figure 3:
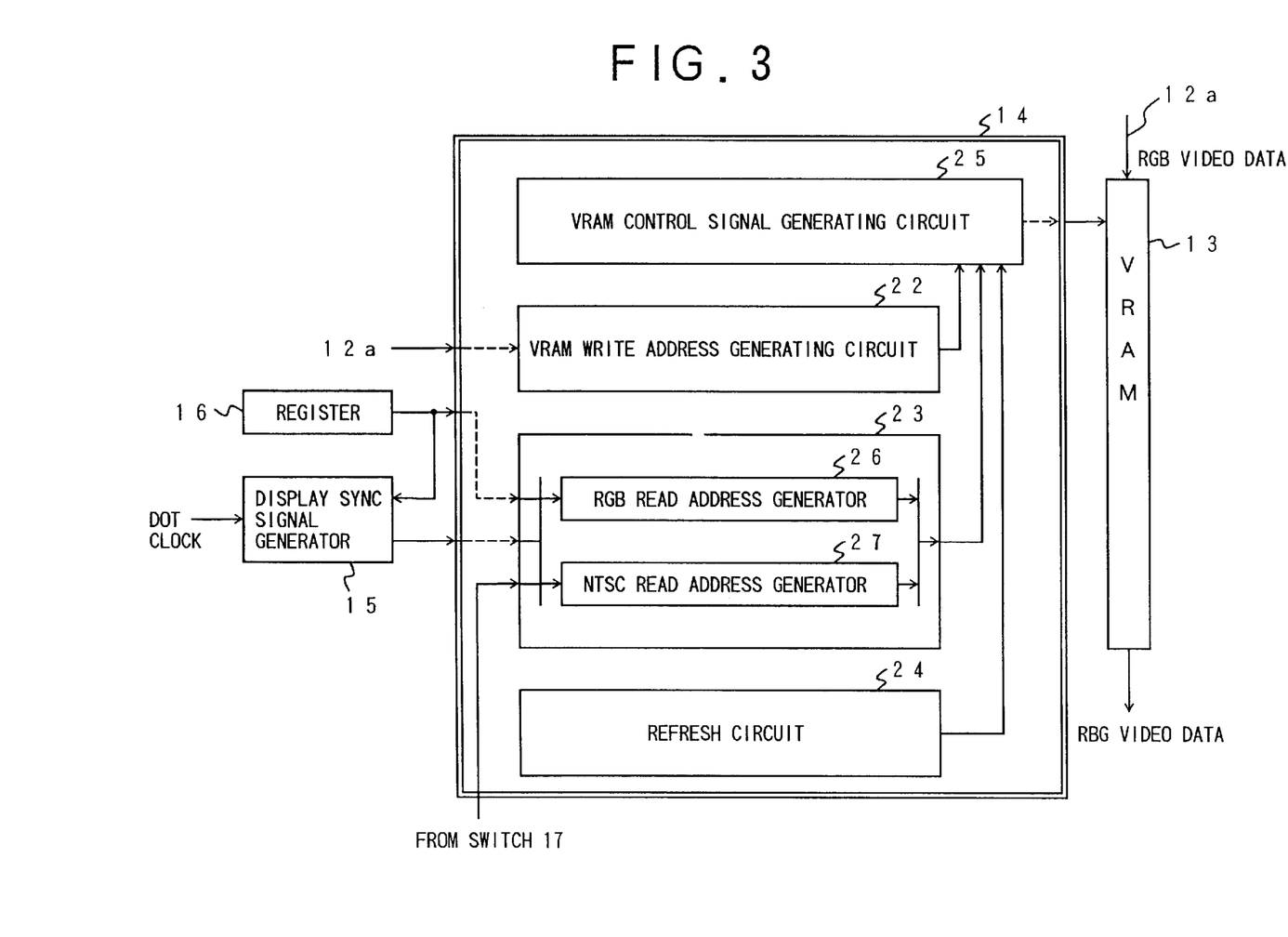
FIG. 3 is a block diagram of a VRAM controller shown in FIG. 2.

FIG. 3 is a block diagram of the VRAM controller 14. The VRAM controller 14 includes a VRAM write address generator 22, a VRAM read address generator 23, a refresh circuit 24 and a VRAM control signal generating circuit 25. The VRAM write address generator 22 is connected to the CPU 12 through a CPU bus 12a shown in FIG. 2. The VRAM write address generator 22 generates, based on an instruction from the CPU 12 transferred through the CPU bus 12a, a write address of the storage area of the VRAM 13 in which the RGB video data should be stored. The VRAM read address generator 23 generates, at a timing in conformity with the RGB display mode, a read address of the storage area of the VRAM 13 in which the RGB video data to be read is stored. Hereinafter, such a read address is referred to as a RGB read address. The VRAM read address generator 23 generates, at a timing in conformity with the NTSC display mode, a read address of the storage area of the VRAM in which the RGB video data to be read is stored. Hereinafter, such a read address is referred to as an NTSC read address. The VRAM read address generator 23 includes a RGB read address generator 26, which generates the RGB read address, and an NTSC read address generator 27, which generates the NTSC read address. The refresh circuit 24 generates a refresh signal (address) to refresh the VRAM 13. The VRAM control signal generating circuit 25 receives the signals from the circuits 22, 23 and 24 and generates control signals necessary to operate the VRAM 13 in the read, write or refresh mode. Examples of these control signals are a row address strobe signal, a column address strobe signal, a write enable signal and an output enable signal.

Figure 4:
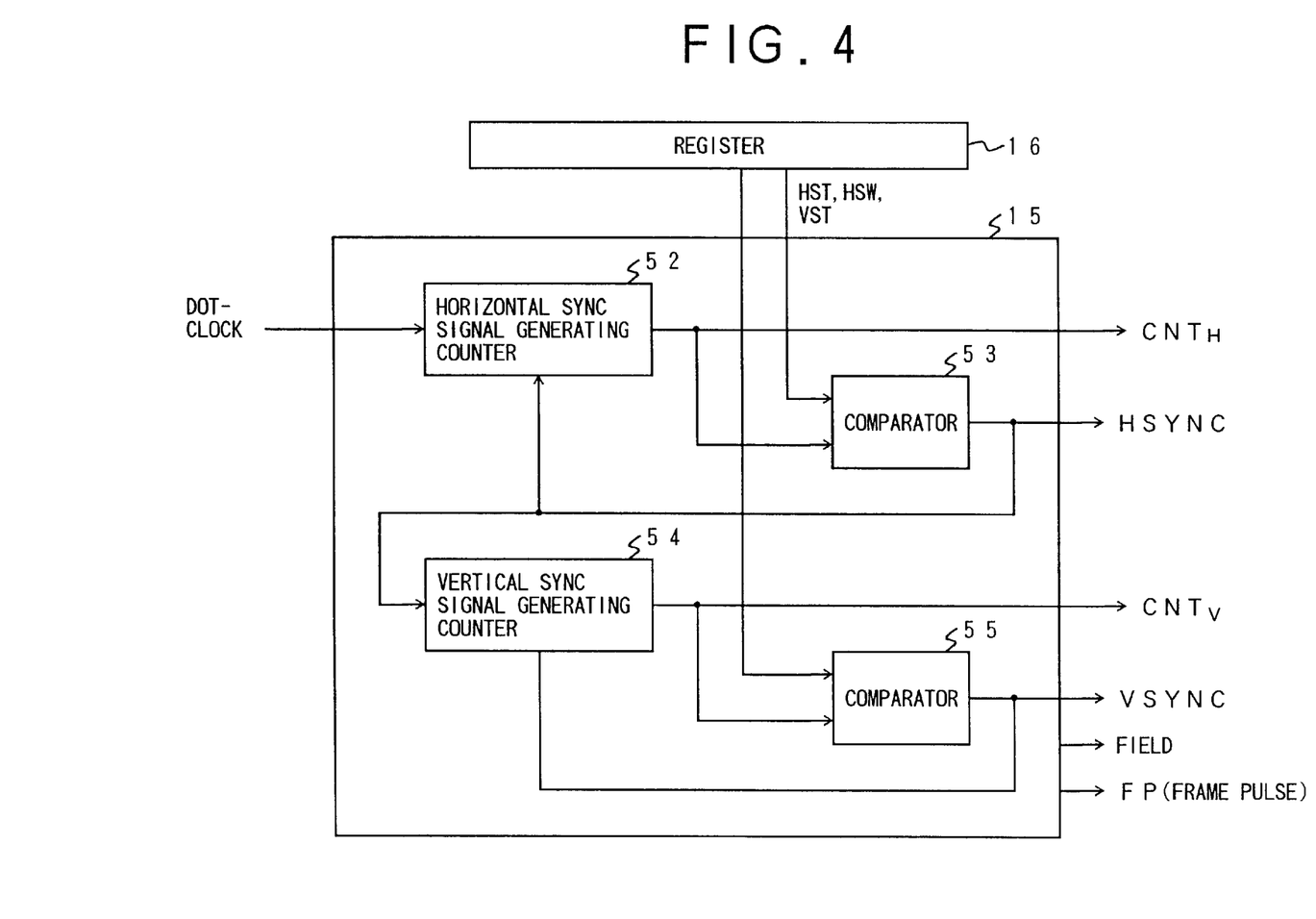
FIG. 4 is a block diagram of a display synchronizing signal generator shown in FIG. 2.

FIG. 4 is a block diagram of the display synchronizing signal generator 15 shown in FIG. 3. The generator 15 includes a counter 52 for generating a horizontal synchronizing signal, a comparator 53, a counter 54 for generating a vertical synchronizing signal, and a comparator 55. The counter 52 counts the dot clock signal and generates a horizontal synchronizing signal count value $CNT_H$. The comparator 53 compares the count value $CNT_H$ with data HST and HSW registered in the register 16, and generates a resultant horizontal synchronizing signal HSYNC.

Figure 5A:
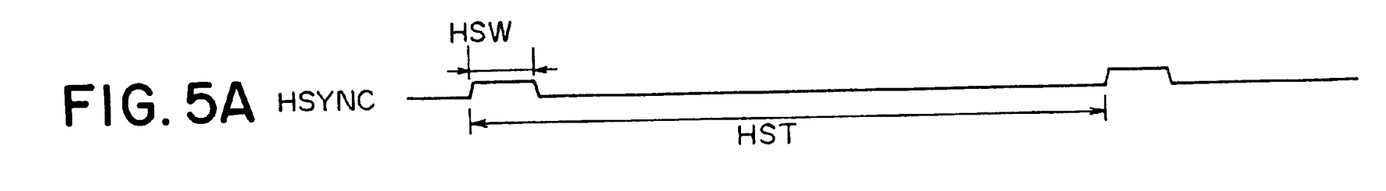
FIGS. 5A and 5B are timing charts showing an operation of the generator shown in FIG. 4.

FIG. 5A shows the horizontal synchronizing signal HSYNC. The data HSW indicates the pulse width and the data HST indicates the horizontal synchronization period.

The counter 54 counts the pulses included in the horizontal synchronizing signal HSYNC, and generates a vertical synchronizing signal count value $CNT_V$. The comparator 55 compares the count value $CNT_V$ with data VST registered in the register 16, and generates a resultant vertical synchronizing signal VSYNC.

Figure 5B:
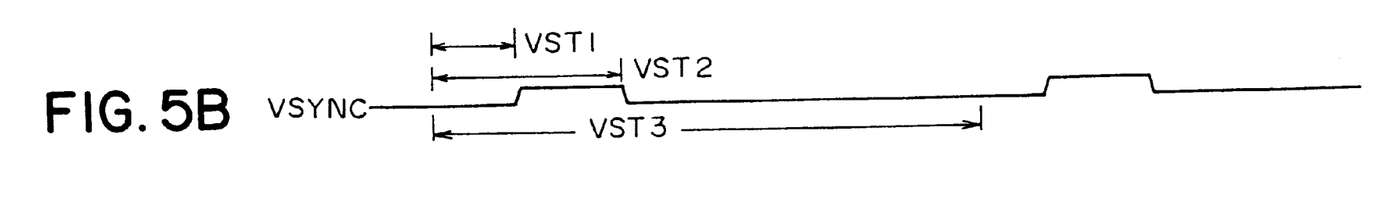

FIG. 5B shows the vertical synchronizing signal VSYNC. The registered data VST includes three items of data VST1, VST2 and VST3. The data VST1 indicates a first vertical synchronizing width, and the data VST2 indicates a second vertical synchronizing width. The data VST3 indicates the vertical synchronizing period.

Further, the display synchronizing signal generator 15 generates a field signal and a frame pulse signal in the conventional way.

Figure 6:
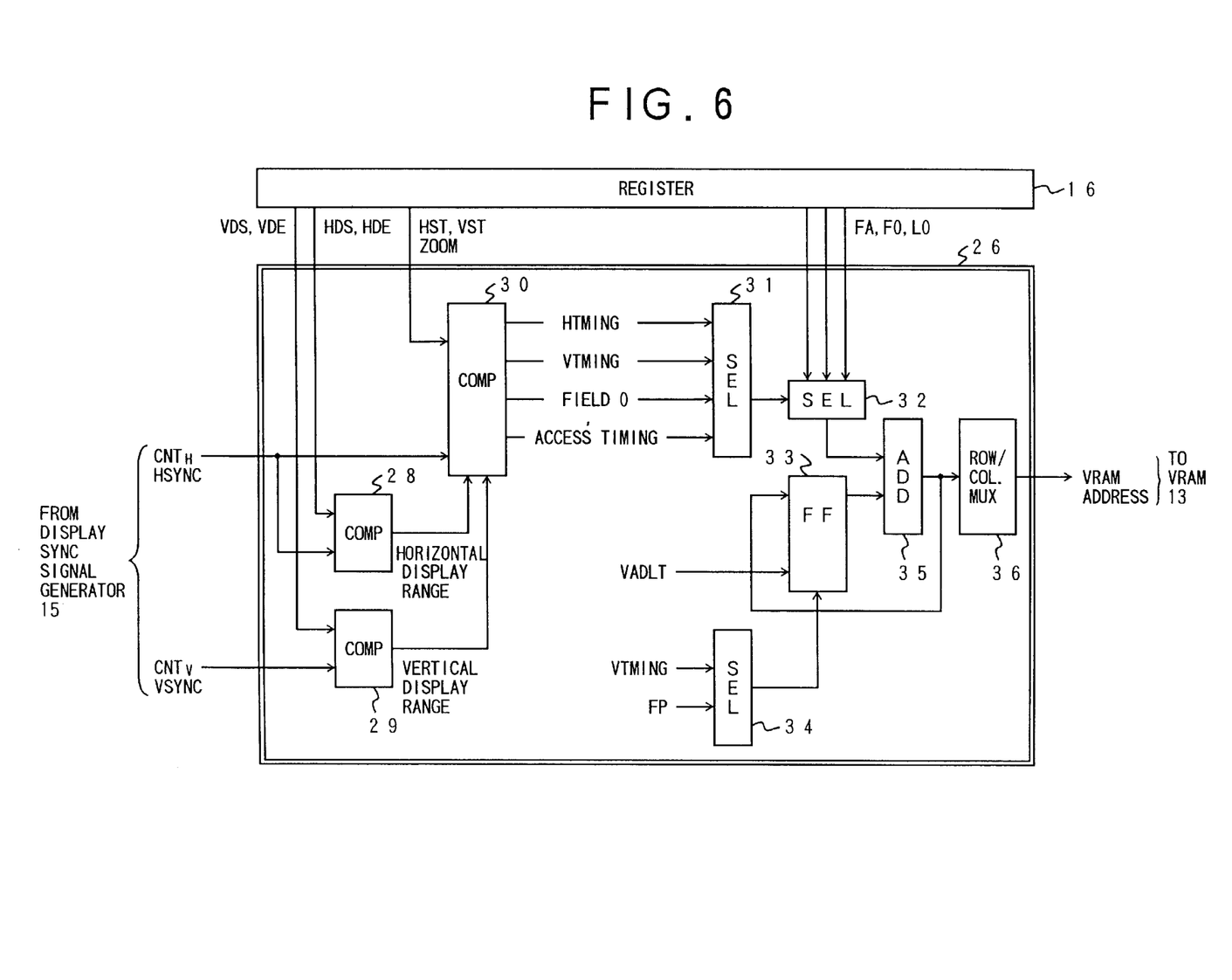
FIG. 6 is a block diagram of a RGB read address generator shown in FIG. 3.

FIG. 6 is a block diagram of the RGB read address generator 26 shown in FIG. 3. The RGB read address generator 26 includes comparators (COMP) 28–30, selectors (SEL) 31, 32 and 34, a flip-flop (FF) 33, an adder (ADD) 35 and a row/column multiplexer (MUX) 36. The comparator 28 compares the horizontal synchronizing signal count value $CNT_H$ generated by the display synchronizing signal generator 15 shown in FIG. 4 with data HDS and HDE indicating a horizontal display range which is predetermined in accordance with the specified display mode and stored in the register 16. Then, the comparator 28 generates a horizontal display range setting signal.

Figure 7A:
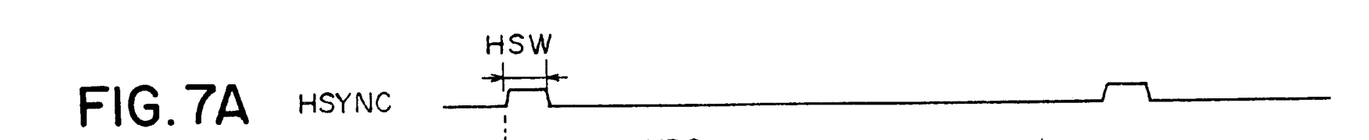
FIGS. 7A and 7B are timing charts showing an operation of the generator shown in FIG. 6.

FIG. 7A shows the horizontal synchronizing signal HSYNC and the horizontal display range setting signal output by the comparator 28. The registered data HDS associated with the pulse of the HSYNC indicates the starting position of the horizontal display, and the registered data HDE associated therewith indicates the ending position thereof.

The comparator 29 compares the vertical synchronizing signal $CNT_V$ generated by the display synchronizing signal generator 15 shown in FIG. 4 with data VDS and VDE indicating a vertical display range which is predetermined in accordance with the specified display mode and stored in the register 16. Then, the comparator 29 generates a vertical display range setting signal.

Figure 7B:
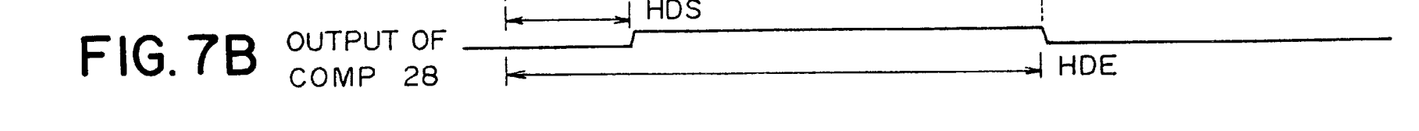
Figure 8A:
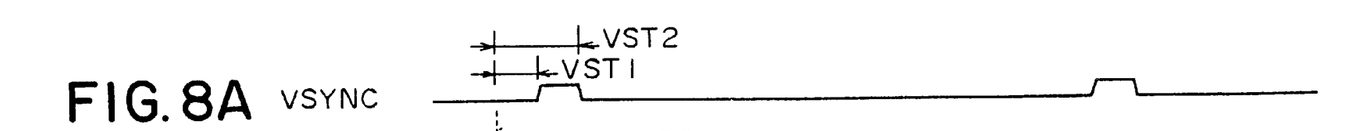
FIGS. 8A and 8B are timing charts showing another operation of the generator shown in FIG. 6.
Figure 8B:
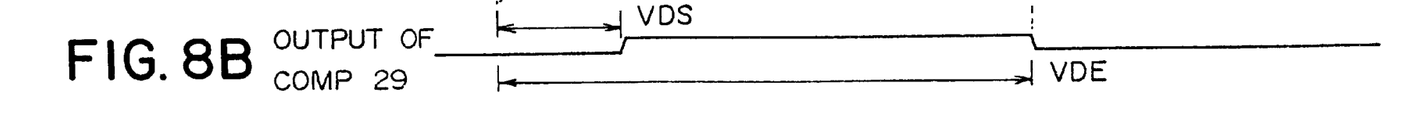

FIG. 7B shows the vertical synchronizing signal VSYNC and the vertical display range setting signal output by the comparator 29. With respect to the data VST1 and VST2 also shown in FIG. 5B, the data VDS and VDE is defined. More particularly the data VDS indicates the starting position of the vertical display, and the data VDE indicates the ending position thereof.

The comparator 30 shown in FIG. 6 receives the count value $CNT_H$, the horizontal and vertical display range setting signals, and predetermined registered data registered in the register 16. Examples of the registered data are the aforementioned HST and VST, and data relating to a zooming process. The comparator 30 generates a horizontal timing signal HTMING, a vertical timing signal VTMING, a field indicating signal FIELD 0, and an access timing signal. The selector 31 selects the signals output by the comparator 30 in a predetermined manner, and applies a selected signal to the selector 32.

The selector 32 performs a selecting operation on data FA, FO and LO registered in the register 16 in accordance with the timing specified by the selected signal from the selector 31.

Figure 9A:
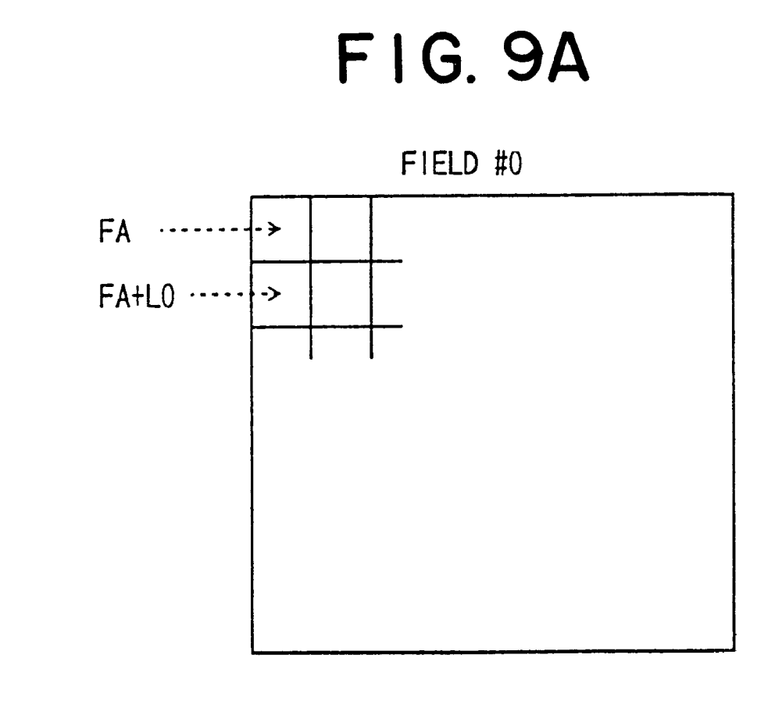
FIGS. 9A and 9B are diagrams showing a mechanism of generating a VRAM address.
Figure 9B:
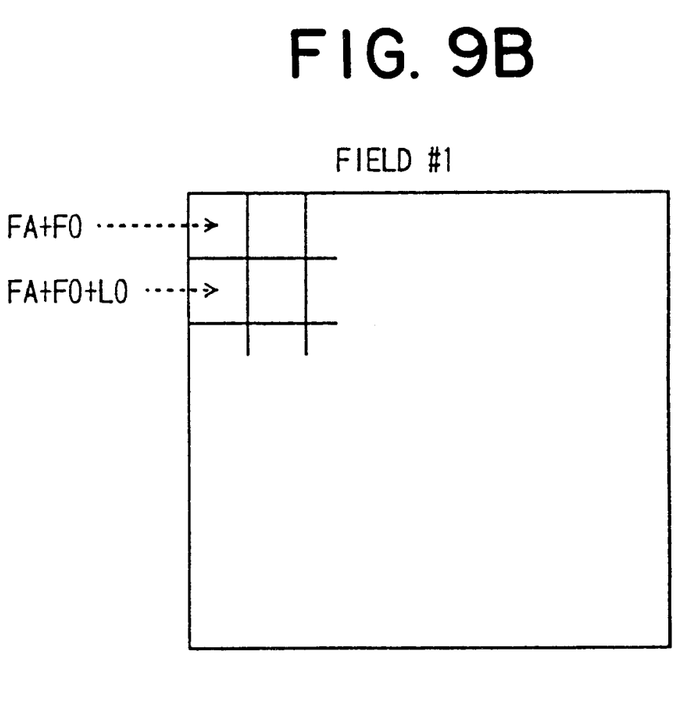

FIGS. 9A and 9B show planes formed in the VRAM 13. Two fields (field #0 and field #1) respectively shown in FIGS. 9A and 9B are formed in an interlace mode. The registered data FA indicates the frame beginning address, and the registered data FO indicates a field-to-field address offset. Further, the registered data LO indicates a line-to-line address offset. Field #0 is formed by the registered data FA and LO, and field #1 is formed by the registered data FA, FO and LO. When one picture plane is formed by one field, the registered data FA and LO are used.

The selected data is applied to the adder 35, at which the output data from the flip-flop 33 is added to the selected data. The output signal of the adder 35 is applied to the multiplexer 36 and the flip-flop 33. The flip-flop 33 operates in synchronism with a timing signal VADLT. The flip-flop 33 is reset in response to either the timing signal VTMING generated by the comparator 30 or the control pulse signal FP generated by the generator 15. The multiplexer 36 performs a multiplexing operation on the output signal of the adder 35 and outputs a resultant VRAM address.

A description will now be given of the operation of the RGB read address generator 26.

First, the count values $CNT_H$ and $CNT_V$ are input to the generator 26. The horizontal display range and the vertical display range are respectively defined by the comparators 28 and 29. The comparator 30 receives the aforementioned signals and data, and generates the aforementioned signals HTMING, VTMING, FIELD 0 and the access timing signals to be supplied to the selector 31.

The selectors 32 and 34, the flip-flop 33, the adder 35 and the multiplexer 36 generate the VRAM address as follows. The display plane (frame) beginning address FA is selected by the selector 32. Initially, the output of the adder 35 is the beginning address FA. The beginning address is latched in the flip-flop 33. Then, the column addresses of the VRAM 13 are generated by the combination of the components 33–35 while the first row address of the VRAM 13 is being selected. Thereafter, the line-to-line offset LO is selected by the selector 35 and is added to the output signal of the flip-flop 33. Then the column addresses of the VRAM 13 with respect to the second row address are generated. The multiplexer 36 multiplexes the row and column addresses from the adder 35 to thereby output the VRAM read address.

When the address of field #1 shown in FIG. 9B is generated, the field-to-filed address offset FO is used.

Figure 10:
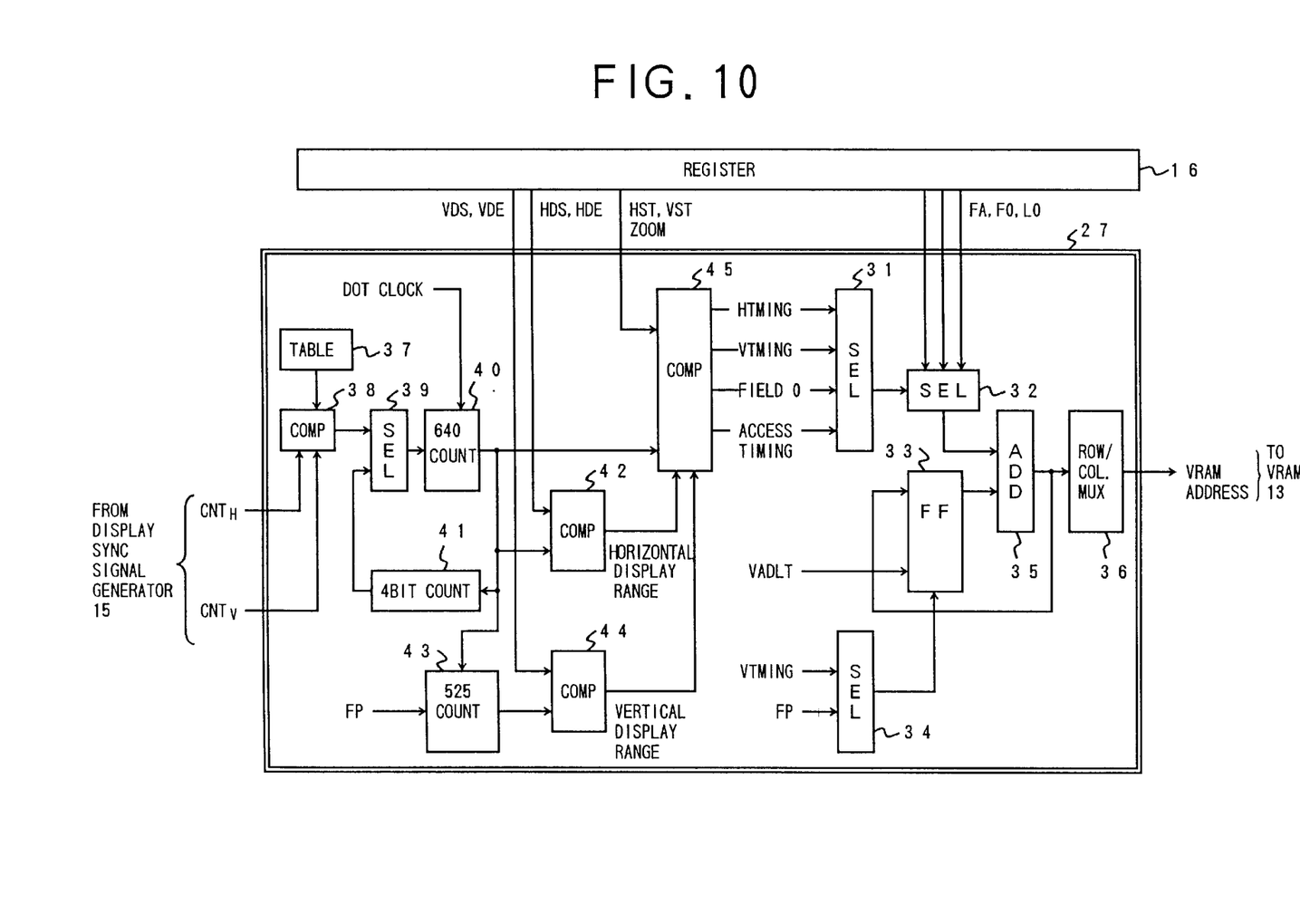
FIG. 10 is a block diagram of an NTSC read address generator shown in FIG. 3.

FIG. 10 is a block diagram of the NTSC read address generator 27, which has the same components as the generator 26. These same components are indicated by the same reference numerals. More particularly, the components 31–36 are also used in the generator 27. The NTSC read address generator 27 generates the VRAM read address at a different timing from the VRAM read address generated by the generator 26.

The generator 27 includes a table, a comparator (COMP) 38, a selector (SEL) 39, a horizontal-direction 640 counter (CNT) 40, a four-bit counter 41, a comparator (COMP) 42, a vertical-direction 525 counter (CNT) 43, a comparator (COMP) 44 and a comparator (COMP) 45. The table 37 stores data used to convert the count values $CNT_H$ and $CNT_L$ into a count value which conforms with the NTSC display mode. The comparator 38 converts the count values $CNT_H$ and $CNT_L$ into the count value conforming with the NTSC mode by referring to the table data stored in the table 37. For example, in the NTSC mode, data is read from the VRAM 13 in a conventional list method. The converted count value is applied to the selector 39, which selects either the selected signal from the selector 39 or the output signal of the counter 41.

The counter 40 counts the selected data up to 640. The counter 41 counts the count value of the counter 40 every four bits. The comparator 42 compares the aforementioned registered data HDS and HDE with the output signal of the counter 40, and generates a timing pulse having either a high level or a low level based on the comparison result. The output signal of the comparator 42 defines the horizontal display range as in the case of the comparator 28. The counter 43 counts the frame pulse FP. The comparator 44 compares the aforementioned registered data VDS and VDE with the output signal of the counter 43, and generates a timing pulse having either the high level or the low level based on the comparison result. The output signal of the comparator 44 defines the vertical display range as in the case of the comparator 29. The comparator receives the registered data HST, VST and ZOOM, the output signal of the counter 40, and the output signals of the comparators 42 and 44, and generates the horizontal timing signal HTMING, the vertical timing signal VTMING, the field indicating signal FIELD 0, and the access timing signal.

The operations of the components 31–36 shown in FIG. 10 are the same as those of the components 31–36.

The NTSC converter 18 converts the RGB data, which is read from the VRAM 13 under the control of the NTSC read address generator 27 shown in FIG. 10, into NTSC television signal.

Figure 11:
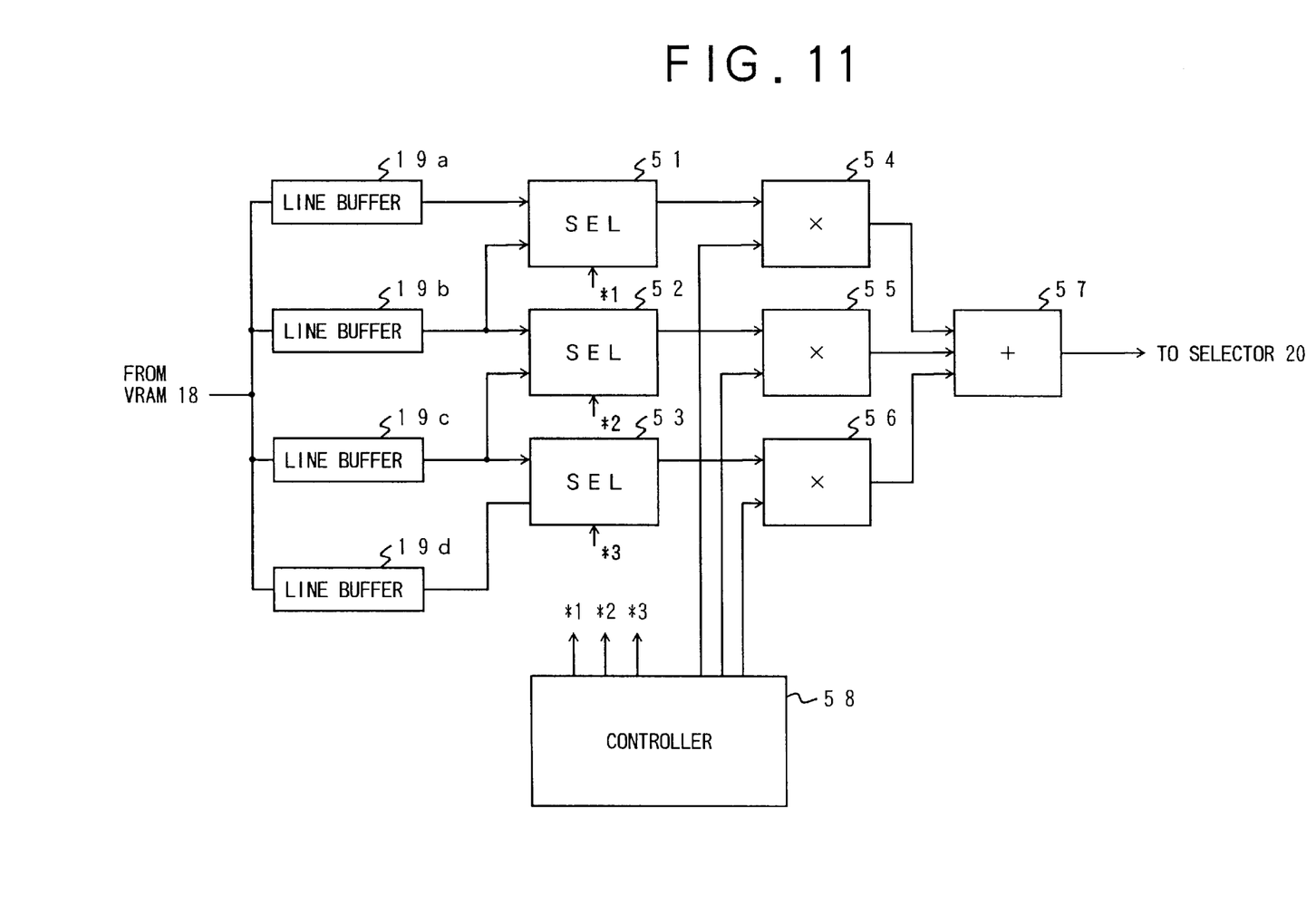
FIG. 11 is a block diagram of an NTSC converter shown in FIG. 2.
Figure 12:
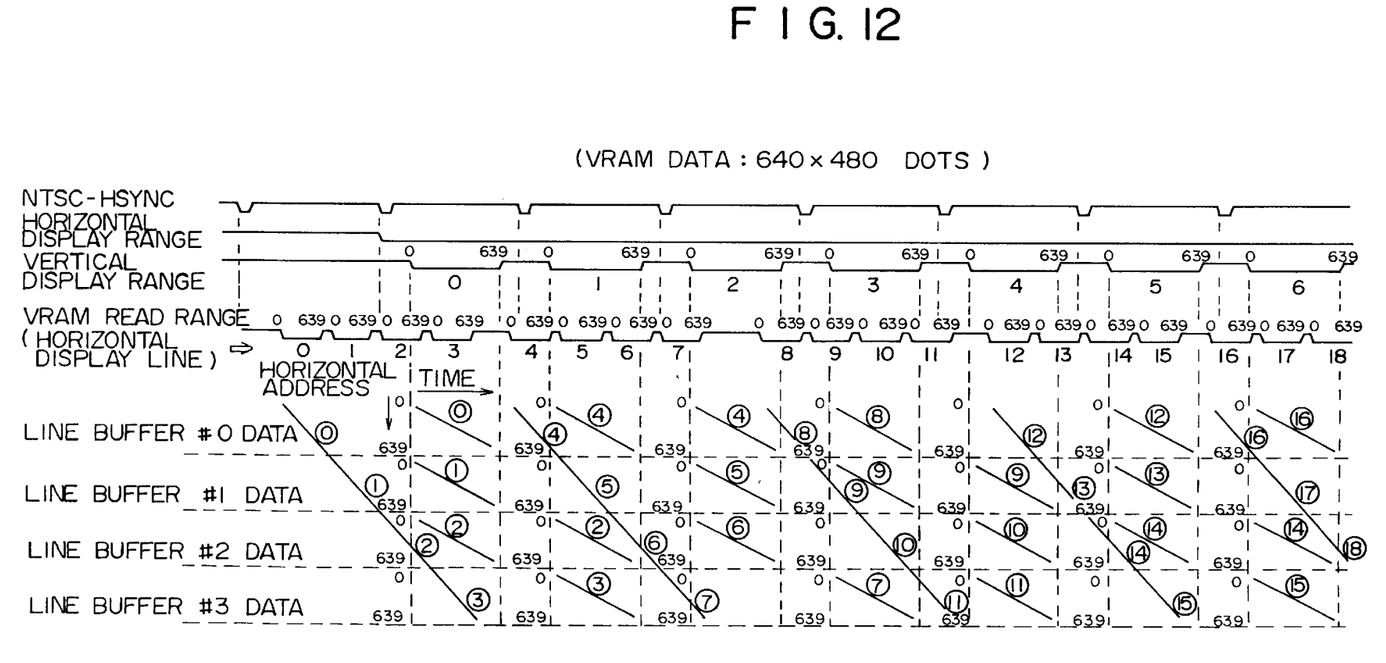
FIG. 12 is a timing chart of an operation of the converter shown in FIG. 11.

FIG. 11 is a block diagram of the NTSC converter 18 and the line buffer 19, which are disclosed in Japanese Laid-Open Patent Application No. 6-219309. The NTSC converter 18 includes selectors 51, 52 and 53, multipliers 54, 55 and 56, an adder 57, and a controller 58. The line buffer 19 is made up of line buffers 19a–19d. The RGB data read from the VRAM 13 and equal to one line is cyclically written into one of the line buffers 19a–19d, and is selected by means of the selectors 51–53, as shown in FIG. 12, which shows the operation related to the odd field. During the first display period of the television signal, the video data of the zeroth line stored in the line buffer 19a is selected, and the video data of the first line stored in the line buffer 19b is selected. Further, the video data of the second line stored in the line buffer 19c is selected. During the second display period of the television signal, video data of the fourth line stored in the line buffer 19a is selected, and the video data of the second line stored in the line buffer 19c is selected. Further, the video data of the third line stored in the line buffer 19d is selected. In this way, during each display period of the television signal, the latch process for video data equal to three lines is performed.

In the even field of the television signal, the video data is latched as follows. During the first display period of the television signal, video data of the first line stored the line buffer 19a is selected, and the video data of the second line stored in the line buffer 19b is selected. Further, the video data of the third line stored in the line buffer 19c is selected. During the second display period of the television signal, the video data of the fifth line stored in the line buffer 19a is selected, and the video data of the third line stored in the line buffer 19c is selected. Further, the video data of the fourth line stored in the line buffer 19d is selected. In this way, during each display period of the television signal, the patch process for video data equal to three lines is performed.

The above selecting operation is carried out in accordance with select signals *1, *2 and *3 generated by the controller 58. The selected video data are applied to the multipliers 54, 55 and 56. The controller 58 supplies the multipliers 54, 55 and 56 with interpolative coefficients for compensating the difference between the number of lines in the RGB mode and the number of lines in the NTSC mode. Then, the multiplied results obtained by the multipliers 54, 55 and 56 are added together at the adder 57, which outputs the added result to the selector 20 shown in FIG. 2.

Figure 13:
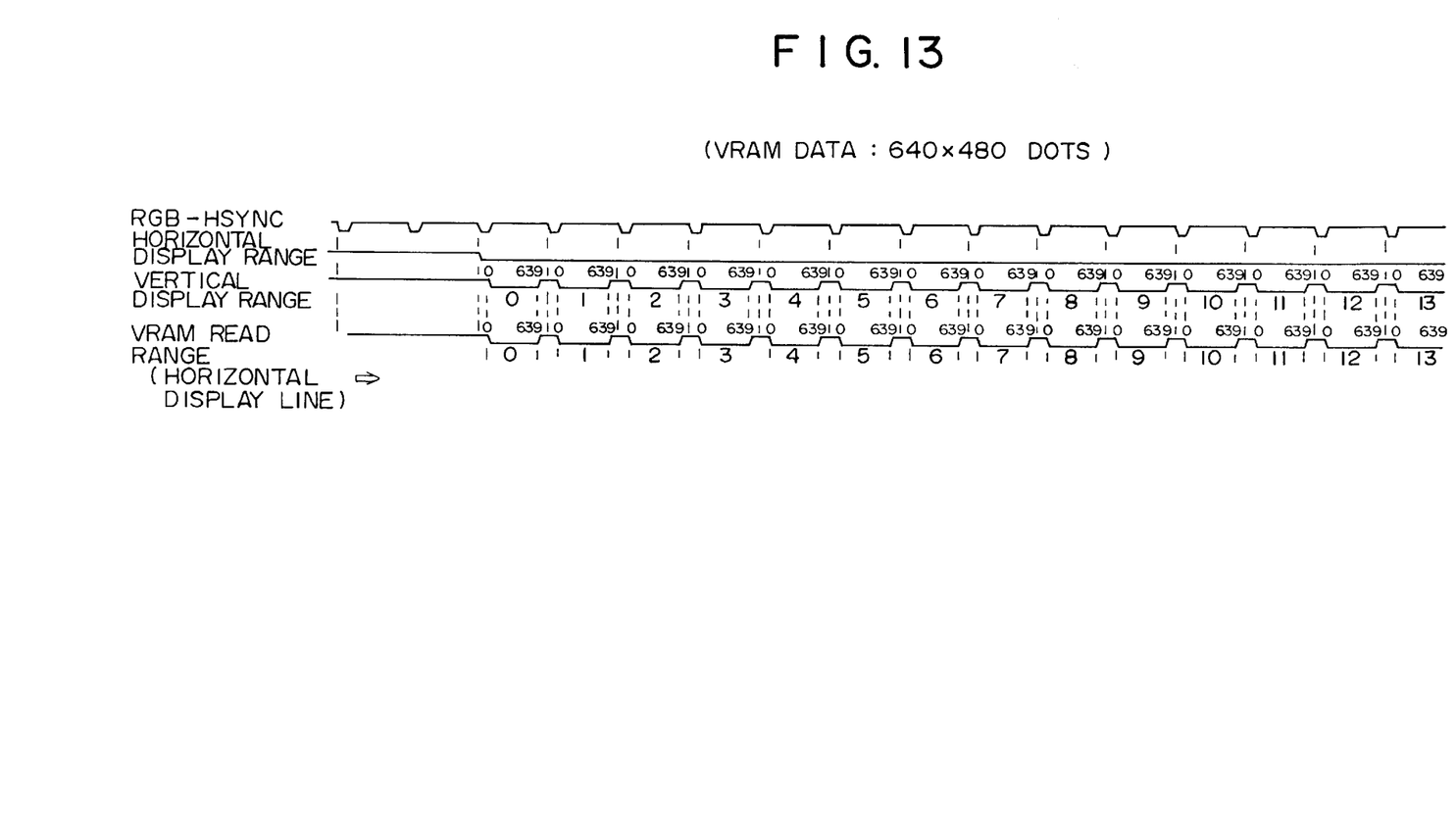
FIG. 13 is a timing chart of a read operation of the VRAM.

FIG. 13 shows the read operation on the VRAM 13 in the RGB mode. As shown in FIG. 13, the RGB data is read from the VRAM 13 in synchronism with the horizontal synchronizing signal HSYNC.

The selector 20 shown in FIG. 2 selects either the RGB video data from the VRAM 13 or the NTSC television signal from the NTSC converter 18 in response to the switching signal supplied from the switch 17. The selected signal is then converted into the analog signal, which is supplied as the RGB output signal or the NTSC output signal, to the display unit 5 shown in FIG. 1. It is possible to connect two display units respectively operable in the RGB mode and the NTSC mode to the D/A converter 21 shown in FIG. 2.

Figure 14A:
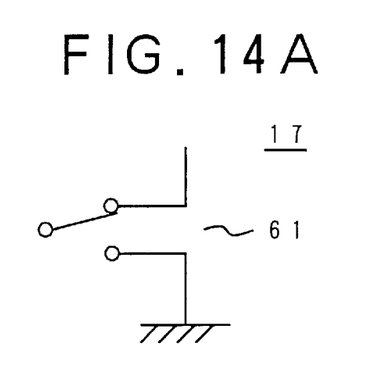
FIGS. 14A, 14B and 14C are diagrams of a switch unit shown in FIG. 2.

FIG. 14A shows an example of the switch 17 shown in FIG. 2. A switch 61 shown in FIG. 14A is a manual (hardware) switch.

Figure 14B:
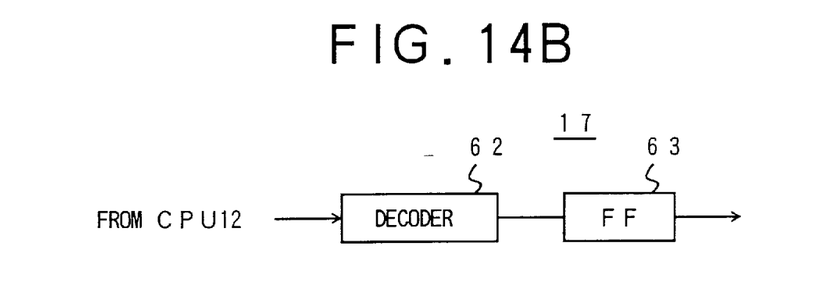

FIG. 14B shows another example of the switch 17. The switch 17 shown in FIG. 14B includes a decoder 62 and a flip-flop 63. The CPU 12 shown in FIG. 2 supplies the decoder 62 with predetermined data, which is then decoded. Resultant decoded data is latched in the flip-flop 63. For example, predetermined data is supplied to the decoder 62 and the NTSC display mode is specified.

Figure 14C:
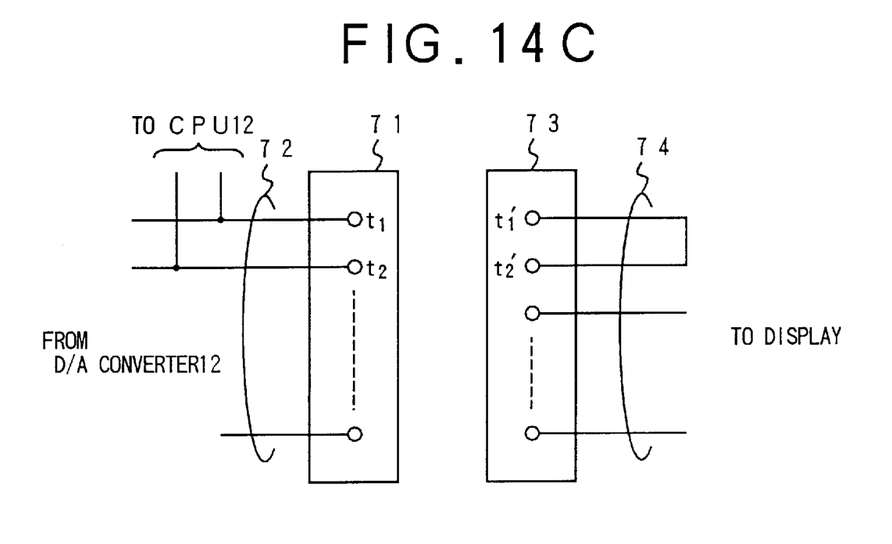

It is also possible to employ another switch structure shown in FIG. 14C. The information processing device has a connector 71 from which a cable having lines extends. A connector 73 is connected to a display unit via a cable having lines. When the connectors 71 and 73 are joined together, a loop is formed via terminals $t_1$, $t_2$, $t_1'$ and $t_2'$. The CPU 12 monitors whether such a loop is formed. Then the loop is detected, the CPU 12 produces the corresponding switching signal to the VRAM controller 14 and the selector 20 shown in FIG. 2. In this case, it is necessary to predetermine whether the loop is related to the RGB mode or the NTSC mode. Usually, the connectors of the RGB mode are different from those of the NTSC mode. If the structure shown in FIG. 14 is provided for the connectors for the NTSC mode, the CPU 12 can recognize that the NTSC mode should be selected when the loop is detected.

The present invention is not limited to the RGB display mode. The present invention includes modes in which the number of scanning lines can be changed in accordance with the synchronizing signal output by the associated information processing device. Further, the display unit 5 shown in FIG. 1 includes not only a visual display unit but also another output device which can be operated in the RGB mode, such as a color printing machine or a video device operable in the RGB mode.

The present invention is not limited to the NTSC display mode, but includes modes in which a fixed number of scanning lines is used, such as PAL, SECAM and MUSE. The display unit 5 shown in FIG. 1 includes a television set, a video cassette recorder, a printer and a communications device which are operable in any of the NTSC, PAL, SECAM and MUSE modes.

The present invention is not limited to the specifically disclosed embodiments, and variations and modifications may be made without departing from the scope of the present invention.

What is claimed is:

1. A video data output device, comprising:

a memory unit which stores video data conforming with a first display mode;

a memory control unit which performs a control for writing the video data conforming with the first display mode into the memory unit and for reading the video data conforming with first display mode from the memory unit at a timing based on the first display mode or another timing based on a second display mode;

a synchronizing signal generating unit which generates synchronizing signals used to define said timing;

a converter unit which converts the video data read at the timing based on the second display mode into another video data conforming with the second display mode; and a selector unit which selects said another video data conforming with the second display mode output from the converter unit or the video data conforming with the first display mode read from the memory unit, wherein the memory control unit, the synchronizing signal generating unit and the selector unit operate in response to a switching signal indicating one of the first and second display modes.

2. The vide data output device as claimed in claim 1, wherein the first display mode is a mode having a variable number of scanning lines for forming a display plane, and the second display mode is a mode having a fixed number of scanning lines for forming a display plane.

3. An information processing device, comprising:

a central processing unit which executes determined processes including a process for generating video data conforming with a first display mode;

a memory unit which stores the video data conforming with the first display mode generated by the central processing unit;

a memory control unit which performs a control for writing the video data conforming with the first display mode into the memory unit and for reading the video data conforming with first display mode from the memory unit at a timing based the first display mode or another timing based on a second display mode;

a synchronizing signal generating unit which generates synchronizing signals used to define said timing;

a converter unit which converts the video data read at the timing based on the second display mode into another video data conforming with the second display mode; and a selector unit which selects said another video data conforming with the second display mode output from the converter unit or the video data conforming with the first display mode read from the memory unit, wherein the memory control unit, the synchronizing signal generating unit and the selector unit operate in response to a switching signal indicating one of the first and second display modes.

4. The video data output device as claimed in claim 3, wherein the first display mode selects a mode having a variable number of scanning lines for forming a display plane, and the second display mode is another mode having a fixed number of scanning lines for forming a display plane.

5. A method of outputting video data, comprising the steps of:

(a) storing video data conforming with a first display mode in a memory unit;

(b) performing a control for writing the video data conforming with the first display mode into the memory unit and reading the video data conforming with the first display mode from the memory unit at a timing based on the first display mode or another timing based on a second display mode;

(c) generating synchronizing signals used to define said timing;

(d) converting the video data read at the timing based on the second display mode into another video data conforming with the second display mode; and (e) selecting said another video data conforming with the second display mode or the video data conforming with the first display mode read from the memory unit, wherein the steps (b), (c) and (e) depend on a switching signal indicating one of the first and second display modes.

* * * * *